Dec. 6, 1955  R. MUNRO  2,725,754
HERMETICALLY-SEALED SHAFT COUPLINGS
Filed Jan. 31, 1952  2 Sheets-Sheet 1
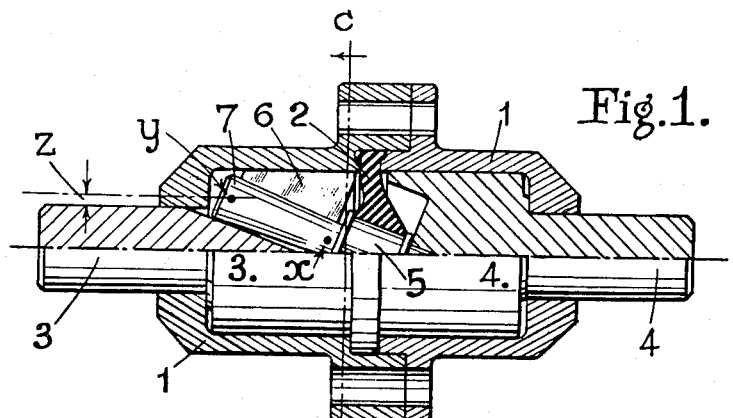
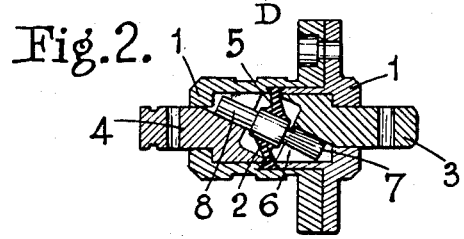
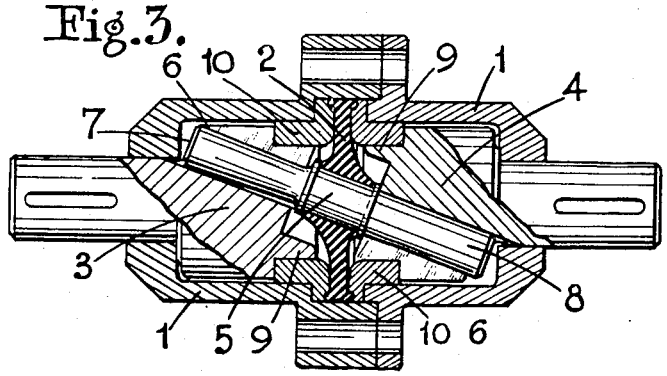
INVENTOR
ROBERT MUNRO Dec. 6, 1955  R. MUNRO  2,725,754
HERMETICALLY-SEALED SHAFT COUPLINGS
Filed Jan. 31, 1952  2 Sheets-Sheet 2

INVENTOR
ROBERT MUNRO
By Emory L. Groff Attorney

United States Patent Office 2,725,754
Patented Dec. 6, 1955

2,725,754

HERMETICALLY-SEALED SHAFT COUPLINGS

Robert Munro, Windlesham, England

Application January 31, 1952, Serial No. 269,185

Claims priority, application Great Britain November 26, 1951

2 Claims. (Cl. 74—18.1)

This invention concerns improvements in hermetically-sealed couplings for connecting together rotary driving and driven elements, such as a pair of co-axial shafts, of the kind in which a seal for air, gas or other fluid is formed at the coupling between the ends of the said shafts, the couplings being useful for miscellaneous apparatus, as for example pumps and compressors, in which the driven pump shaft is connected to a suitable driving shaft, or to an electric motor or other prime mover.

The said invention is more particularly concerned with the known type of hermetic coupling of the foregoing kind in which the co-axial shaft ends are rotatably mounted within an outer casing and are connected by a wobble pin inclined to and crossing the common axis of the shafts, the ends of said pin being in driving engagement respectively with the opposed ends of the shafts by entering recesses such as slots or bores therein or co-acting with projections thereon, while the pin is secured at its middle to a flexible sealing diaphragm carried fixedly at its periphery by the casing in which the ends of the shafts are mounted. For convenience when interposing the coupling between a pair of long shafts, the coupling includes a pair of co-axial dogs permanently assembled in the casing and adapted to be secured to the shafts; the dogs virtually constitute the shaft ends and are described herein as shafts. In operation with this known type of coupling the pin does not rotate on its own axis, its middle being fixedly held in the diaphragm, but each half of the pin generates a cone with the respective apices touching at the middle, the ends describing circles and moving around with the shafts, one end being moved by the driving shaft and the other driving the driven shaft. Such a general construction is referred to herein as being of "the type set forth."

In couplings of the type set forth it has been found essential that the ends of the wobble pin shall have a reasonable degree of play in their respective recesses in the ends of the shafts, for example three or four thousandths of an inch with a coupling for a half-inch shaft, and during the life of the coupling the play is naturally increased by wear. As a result, unless suitable provision is made, the coupling fails to transmit the drive, this being mainly due to the fact that the pin skews sideways to an imperceptible degree in its recesses immediately the drive commences, with the result that the driven end of the pin takes up its driving thrust against the side wall of the shaft recess well away from its extremity i. e. at a point located at or near the mouth of the recess very near the axis of the system. This produces a very short and negligible throw at the driven end of the pin where the thrust is applied.

The object of the invention is to obviate such a defect and to ensure that the driving thrust of the wobble pin on the driven shaft is located at the greatest possible distance from the longitudinal axis of the system, and preferably distributed from that point lengthwise along the pin towards its middle.

According to the invention the wobble pin is constructed with an enlargement at or near the extremity of its driven end to ensure that the pin will have a thrust contact with the recess or equivalent of the driven shaft at a maximum distance from the axis of the system under driving conditions. The enlargement is formed by tapering the end of the wobble pin divergently from the direction of its middle, and also in such a way that the thrust is distributed along the length of the pin in engagement with the shaft recess including the end contact at the maximum distance from the axis of the system.

In order that the said invention may be readily understood some embodiments thereof will be described, by way of example, with the aid of the accompanying drawings wherein:

Figures 1 to 4 show in longitudinal section different forms of coupling according to the invention;

Figure 5 is a diagram hereinafter referred to.

Figure 4:
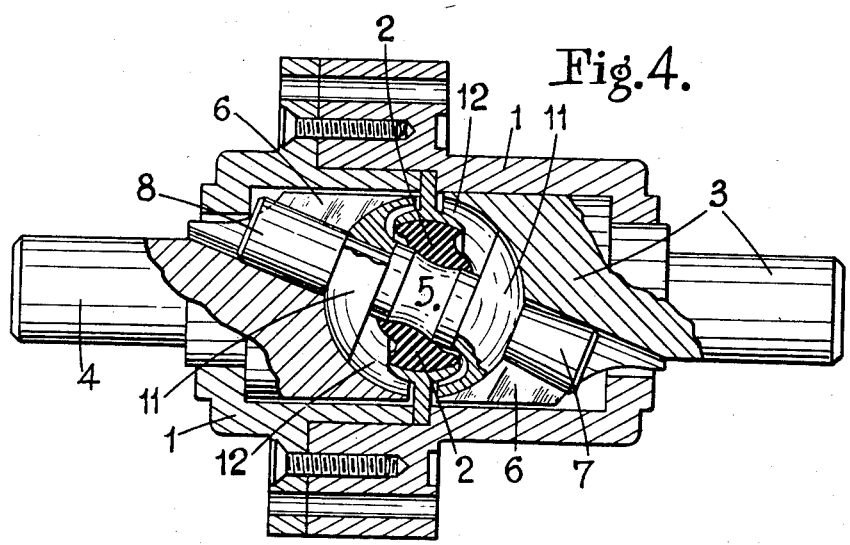

The general features of construction in known couplings of the type set forth, which are also common to all the embodiments of the present invention, are an external casing 1, a flexible sealing diaphragm 2 of natural or synthetic rubber or other suitable material such as a tough flexible plastic which is fixed by its periphery inside the casing so as to divide the casing into two compartments with liquid and gas-tight seal therebetween, a pair of co-axial shafts 3 and 4 rotatable in the casing one in each of the compartments separated by the diaphragm, a wobble pin passing through the diaphragm and secured by its middle 5 thereto also in fluid-tight manner, the wobble pin being inclined to the common axis of the two shafts and a recess 6 in each shaft end into which recesses the respective ends 7 and 8 of the wobble pin are inserted.

Figure 5:
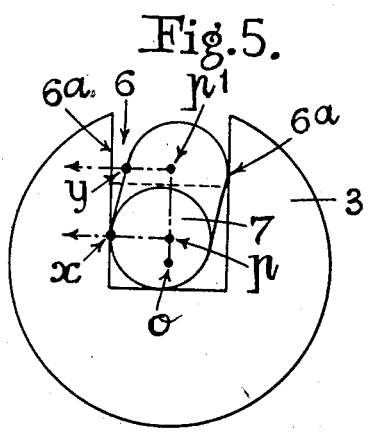

To illustrate the loss of power transmission by reason of the pin skewing in its recess due to the play as hereinbefore referred to, reference is directed to the diagram Figure 5. This represents the end surface of the driven shaft 3 which faces the diaphragm 2 and the driving end 7 of the wobble pin is shown in the recess 6; in effect it is a section on the line C—D of Figure 1 in diagrammatic outline showing just the two parts 3 and 7 but with the clearance between the pin and the recess side walls 6a greatly exaggerated. The shaft 3 is driven by the wobble pin, the latter itself being driven by the shaft 4 (Figure 1) on the other side of the diaphragm. Immediately the drive commences, the pin end 7 moves askew as illustrated, with the result that driving contact with the loaded shaft 3 takes place at $x$ against the recess wall 6a; this point $x$ is also indicated in Figure 1, and it will be seen that the throw or leverage is reduced to negligible proportions (distance op where $o$ is the axis of the shaft 3). The maximum driving effort, however, would be produced when the pin end 7 engages the wall 6a near its outer end, i. e. at point $y$ because in such a case the throw is increased to $op^1$ ($y$ also being marked in Figure 1). The embodiments of the present invention, now to be described, ensure that a working contact is always made at or near the point $y$.

Referring to Figure 1, the driving shaft is designated 4 and the driven shaft 3; thus the wobble pin is driven by shaft 4 and its end 7 drives the shaft 3. The end 7 is tapered divergently towards its end thus forming a reduced diameter or waist in the region of the point $x$. This ensures working contact between the pin and the wall of the recess 6 at the end of the pin in the region of the point $y$, with the advantage already explained. It has been found that efficiency is increased when point $y$ is outside the diameter of the shaft 3 where it takes a bearing in the end wall of the casing, this overhang distance being indicated at $z$. The angle of taper is preferably so determined in relation to the degree of clearance in the recess 6 that when the wobble pin takes up its driving position askew in the recess 6 the periphery of the tapered part lies against the wall of the recess on the thrust side on a line longitudinal of the pin. In other words the pin's periphery between the points *x* and *y* would make linear contact with the wall to avoid concentration of thrust at one area in the region of *y*.

Figure 2 is another form of the embodiment shown in Figure 1 (the driving being shown from left to right in this case, and the end 7 of the wobble pin being again tapered), and such a form is suitable for small hand-driven couplings in which a knob or hand-wheel (not shown) is secured to the outwardly projecting stub of the shaft 4 and is sleeved to take a bearing on the exterior of the casing 1.

In Figure 3, the driving end 7 of the wobble pin is tapered as in Figure 1 but in this case the shafts are reduced at 9 to spigot respectively in a pair of rings 10 used also for clamping the diaphragm 2 and thus providing an internal bearing for the shafts.

In Figure 4 the driving end 7 of the wobble pin is again tapered, but in this case the pin is furnished with hemispherical bearing flanges 11 which lie in corresponding sockets 12 made in the ends of the shafts.

I claim:

1. A hermetically sealed coupling including an outer casing, a cylindrical bore at each end of the casing, a flexible diaphragm supported fixedly within the casing and sealing one cylindrical bore from the other, a pair of co-axial shafts rotatably mounted respectively within the casing cylindrical bores, a wobble pin passing through the diaphragm, inclined to and crossing the axis of the shafts and having its ends in driving engagement respectively with the shafts, said flexible diaphragm being secured in a hermetically sealed manner to the middle of the wobble pin, characterised in that the driven end of the wobble pin is divergently tapered from said middle portion, thereby making the thrust contact with the driven shaft at a maximum distance from the axis of the system under driving condtions, and is housed in a recess in the end of the shaft within which it has a degree of side to side play, the angle of the taper being so determined in relation to the degree of clearance in the recess of the driven shaft that when the wobble pin takes up a skew driving position owing to its side to side play, the periphery of the tapered part lies against the wall of the recess on the thrust side on a line longitudinal of the pin so that the thrust is distributed along the length of the pin including the end contact at the maximum distance from the axis of the system.

2. A hermetically sealed coupling including an outer casing, a cylindrical bore at each end of the casing, a flexible diaphragm supported fixedly within the casing and sealing one cylindrical bore from the other, co-axial drive and driven shafts rotatably mounted respectively within the casing cylindrical bores, a wobble pin having a uniformly cylindrical centre portion passing through the diaphragm, inclined to and crosing the axis of the shafts and having each opposite end in driving engagement respectively with each co-axial shaft, said diaphragm being secured in a hermetically sealed manner to the uniformly cylindrical centre portion of the wobble pin characterised in that the driving end of the wobble pin is housed in a socket in the end of said co-axial drive shaft, and the driven end of the wobble pin is divergently tapered from said centre portion, thereby forming an enlarged tapered end which is housed in a socket in the end of said driven shaft with a degree of side to side play, the angle of the taper being so determined in relation to the degree of clearance in the recess of the driven shaft that when the wobble pin takes up a skew driving position owing to its side to side play, the thrust is distributed along the length of the pin including the end contact at the maximum distance from the axis of the system.

References Cited in the file of this patent

UNITED STATES PATENTS

| | | |
|---|---|---|
| 2,065,834 | Swennes | Dec. 29, 1936 |
| 2,107,090 | Swennes | Feb. 1, 1938 |
| 2,449,772 | Gilman | Sept. 21, 1948 |
| 2,454,340 | Reichel | Nov. 23, 1948 |
| 2,472,010 | Gilman | May 31, 1949 |
| 2,627,753 | Munro | Feb. 10, 1950 |

FOREIGN PATENTS

| | | |
|---|---|---|
| 15,172 | Great Britain | Nov. 21, 1912 |